United States Patent
Wu et al.

(10) Patent No.: US 7,480,835 B2
(45) Date of Patent: Jan. 20, 2009

(54) TESTING SYSTEM AND TESTING METHOD FOR A LINK CONTROL CARD

(75) Inventors: Kang Wu, Shenzhen (CN); Wei Zhang, Shenzhen (CN); Jun Huang, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 426 days.

(21) Appl. No.: 11/440,315

(22) Filed: May 24, 2006

(65) Prior Publication Data

US 2007/0018668 A1    Jan. 25, 2007

(30) Foreign Application Priority Data

Jul. 22, 2005    (CN) .................... 2005 1 0036142

(51) Int. Cl.
*G06F 11/00*    (2006.01)

(52) U.S. Cl. ...................................... 714/47
(58) Field of Classification Search ............... 714/4–10, 714/27, 31, 37, 43, 47, 56
See application file for complete search history.

(56) References Cited

U.S. PATENT DOCUMENTS

| 4,608,562 | A | * | 8/1986 | Minor et al. ........... 340/825.59 |
| 4,622,647 | A | * | 11/1986 | Sagnard et al. ............. 702/118 |
| 6,574,589 | B1 | * | 6/2003 | Shoyama ..................... 703/25 |
| 6,809,505 | B2 | * | 10/2004 | Peeke et al. .................... 324/66 |
| 7,194,673 | B2 | * | 3/2007 | Tuttle et al. ................. 714/775 |
| 2003/0195738 | A1 | * | 10/2003 | Shoyama ..................... 703/25 |

* cited by examiner

*Primary Examiner*—Nadeem Iqbal
(74) *Attorney, Agent, or Firm*—Morris Manning Martin LLP; Tim Tingkang Xia, Esq.

(57) ABSTRACT

A system and method for testing a link control card (LCC) includes a host, a middle plane (MP), and an array having a plurality of testing devices. The host is connected to the LCC for transmitting signals, and the host is connected to the array for sending out commands and receiving results. The MP is connected between the LCC and the testing device array. Each of the testing devices includes a micro-controller unit (MCU), a connector connected to the MCU for receiving the signals, a hub connected to the connector for testing the signals, a voltage margin control unit connected to the MCU for controlling a voltage margin of the LCC, an address setting unit connected to the MCU, and a first interface connected to the MCU for outputting results.

20 Claims, 4 Drawing Sheets

TESTING SYSTEM AND TESTING METHOD FOR A LINK CONTROL CARD

CROSS-REFERENCES TO RELATED APPLICATION

Relevant subject matter is disclosed in the copending U.S. patent application filed on the same day, and entitled "SYSTEM AND METHOD FOR TESTING A LINK CONTROL CARD" with Ser. No. 11/440,318 which is assigned to the same assignee as this patent application.

BACKGROUND OF THE INVENTION

1. Field of the Invention

The present invention relates to a testing system and a testing method for a link control card (LCC), and particularly to a testing system and testing method for testing work reliability of the LCC.

2. General Background

With the development of information technology, a magnetic disc array is more and more popularly used for various application systems in enterprises. The magnetic disc array provides an additive enclosure storage device for extending storage capacity of a single host or server, and is connected to the host by a small computer system interface (SCSI) or other interfaces. The magnetic disc array is used in storage area networks (SANs) by means of a fiber channel interface, for sharing storage capacities among a plurality of hosts. The magnetic disc array with fiber channel adopts the fiber channel technology and has a fiber channel interface connected to the magnetic disc array's exterior such as a host, with fiber channel technology in it's interior.

Presently, a conventional fiber channel storage device includes two LCCs, a middle plane (MP), a magnetic disc array having fifteen hard disk drives (HDDs), and two power supplies. In a testing procedure of the fiber channel storage device, a host transmits commands and fiber channel signals to the magnetic disc array via a host bus adaptor (HBA) to do reading and writing testing of the LCCs.

However, the foregoing testing method is not able to test functioning of the LCCs across a marginal voltage range: when supply voltages of each of the LCCs are 5 V and 2.5 V, each of the LCCs are tested at a range, for example, from 4.75 to 5.25 V and from 2.375 to 2.625 V, thus discovering if the fiber channel signals that each of the LCCs transmits may be distorted when operating near but not at the rated voltages.

What is needed is a low cost testing system and testing method for readily testing operation of an LCC of a storage device across a voltage range.

SUMMARY

An exemplary testing system and testing method for a link control card (LCC) of a storage device is provided. The testing system includes a host, a middle plane (MP), and an array having a plurality of testing devices. The LCC comprises two terminals, one of the terminals is connected to the host. The host transmits signals to the LCC. The MP comprises two terminals, one of the terminals is connected to the other one of the terminals of the LCC. The array is connected to the other one of the terminals of the MP, and the testing device array is connected to the host for receiving commands and returning results. Each of the testing devices comprising a micro-controller unit (MCU); a connector connected to the MCU for receiving the signals; a hub connected to the connector for testing the signals that are received; a voltage margin control unit connected to the MCU for controlling a voltage margin of the LCC; an address setting unit connected to the MCU; and a first interface connected to the MCU for outputting results.

Other advantages and novel features will become more apparent from the following detailed description when taken in conjunction with the accompanying drawings, in which:

DETAILED DESCRIPTION OF THE EMBODIMENT

Figure 1:
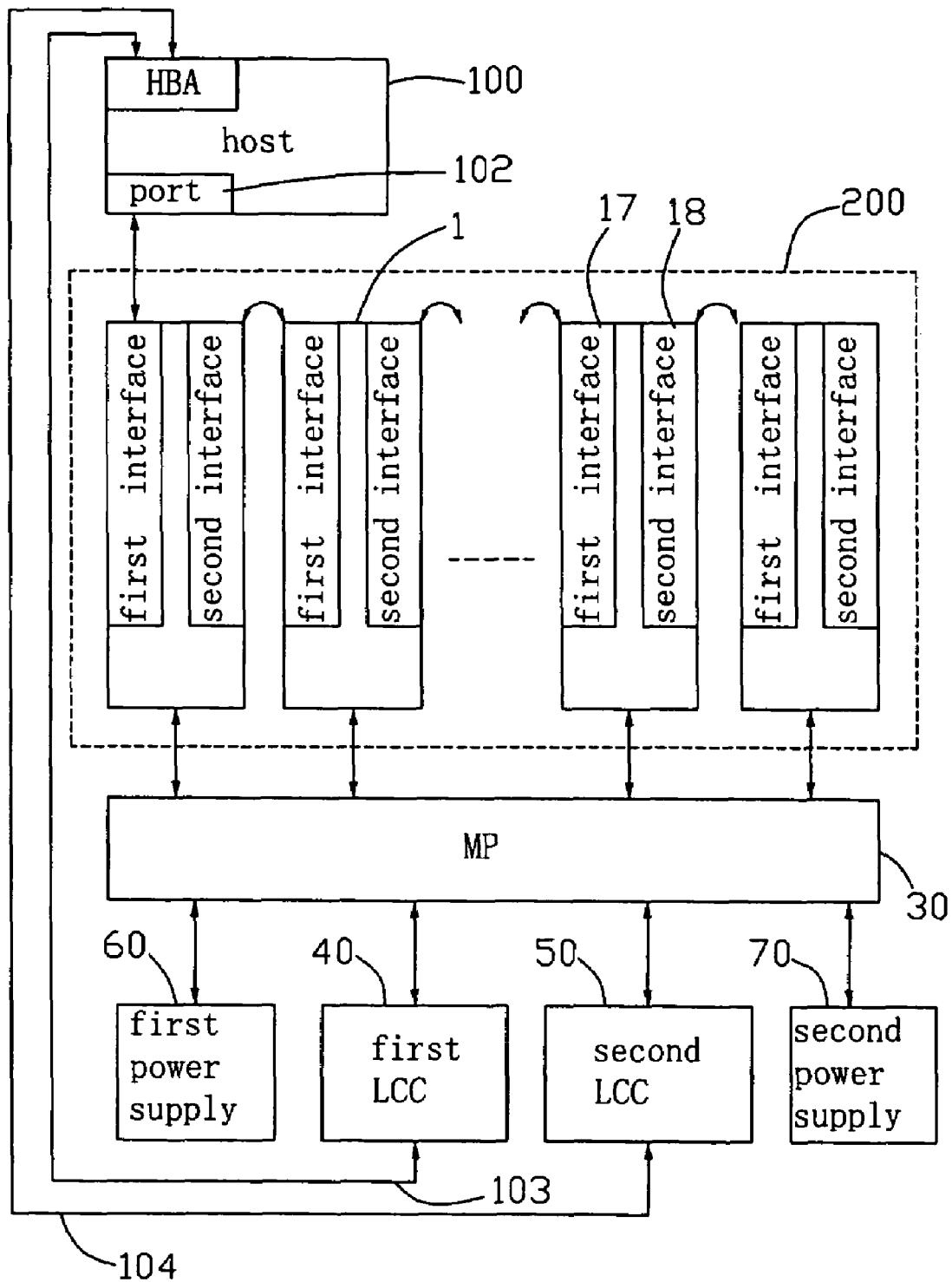
FIG. 1 is a block diagram of a testing system for a link control card (LCC) of a fiber channel storage device in accordance with a preferred embodiment of the present invention; the testing system includes a testing device array having a plurality of testing devices.

Referring to FIG. 1, a testing system for a link control unit of an electronic device like a link control card (LCC) of a fiber channel storage device in accordance with an embodiment of the present invention includes a host 100 with a host bus adaptor (HBA), a testing device array 200 with fifteen testing devices 1 connected in series, a middle plane (MP) 30, a first LCC 40, a second LCC 50, a first power supply 60, and a second power supply 70. Each of the first LCC 40 and the second LCC 50 has fifteen transmission paths to be tested. Each transmission path is respectively tested by a corresponding one of the testing devices 1. The host 100 is connected to the testing device array 200 via a serial port 102 for sending out commands and receiving results. Each of the first LCC 40 and the second LCC 50 has two terminals, and the host 100 is connected to one of the terminals of the first LCC 40 and one of the terminals of the second LCC 50 via two fiber optic cables 103 and 104 respectively for transmitting fiber channel signals. The MP 30 has two terminals, and one of the terminals is connected to the other terminals of the first LCC 40 and the second LCC 50, and the other one of the terminals is connected to the testing device array 200. The host 100 outputs two-way fiber channel signals to the first LCC 40 and the second LCC 50, then the signals are distributed to each of the testing devices 1 by the MP 30 for analysis by the respective tests of each testing device 1.

Figure 2:
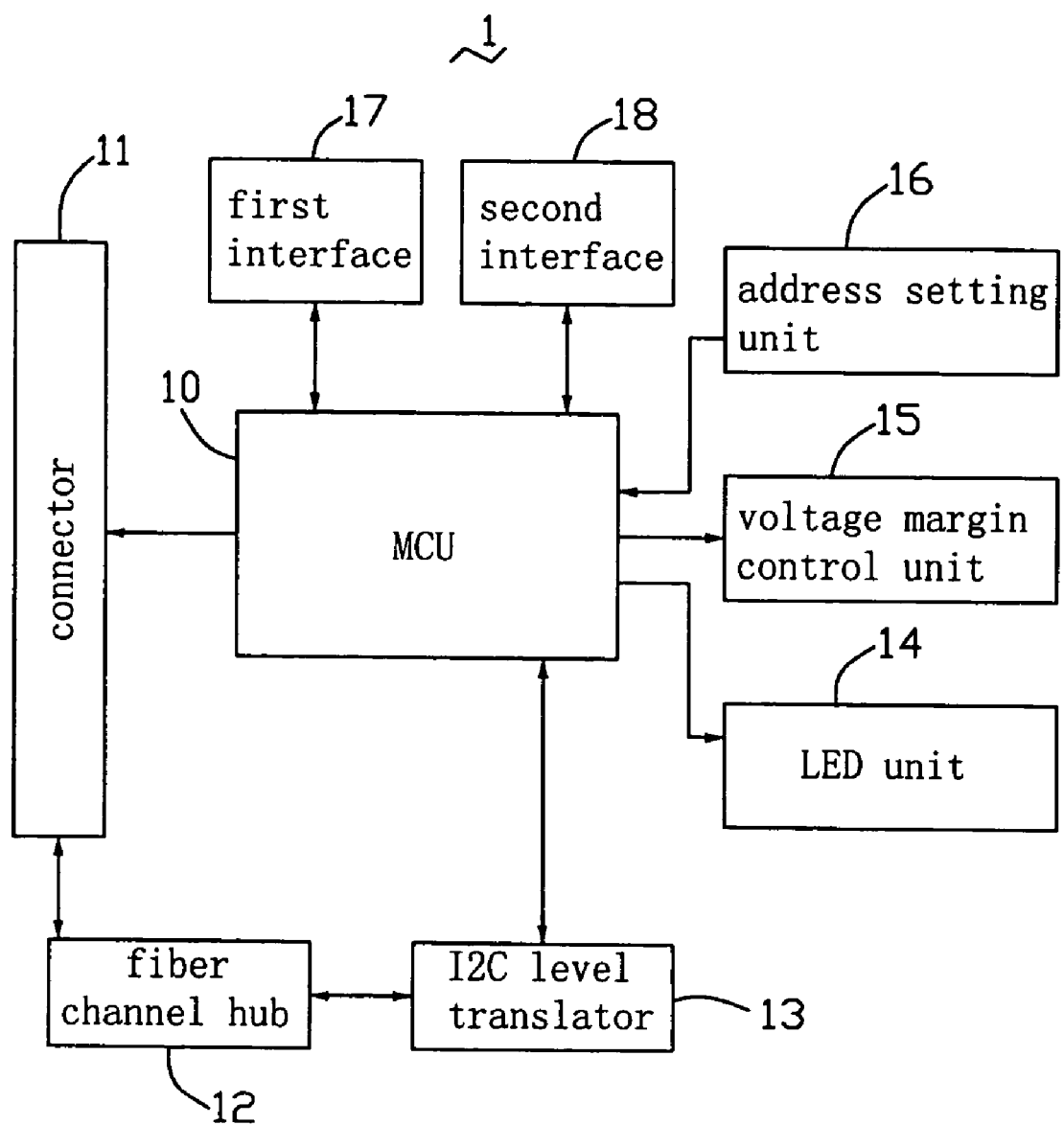
FIG. 2 is a block diagram of each testing device of the testing device array of FIG. 1.

Referring also to FIG. 2, each testing device 1 of the testing device array 200 of the testing system of FIG. 1 includes a micro-controller unit (MCU) 10, a connector 11, light-emitting diode (LED) unit 14, a voltage margin control unit 15, an address setting unit 16, a first serial interface 17, and a second interface 18.

The MCU 10 is a model PIC18F6520. The connector 11 is connected to the MCU 10, and meets with magnetic disc interface standard SFF-8045 for fiber channels. Each testing device 1 is separately connected to the other terminal of the MP 30 via the connector 11, for receiving fiber channel signals that the MP 30 distributes. The fiber channel hub 12 (Model, BCM8422, for example) is connected to the connector 11, for testing the fiber channel signals. The 12C level translator 13 is connected between the MCU 10 and the fiber channel hub 12, for converting voltage levels therebetween.

The LED unit 14 is used for showing a testing state of each of the testing devices 1. The LED unit 14 includes a red LED. When a testing device 1 finds an error, the red LED will be activated. The voltage margin control unit 15 is connected to the MCU 10, for controlling a voltage margin of the first LCC 40 or the second LCC 50. The address setting unit 16 is connected to the MCU 10. The first serial interface 17 (RS232, for example) is connected to the MCU 10, for outputting results. The second interface 18 (RS232, for example) is connected to the MCU 10, for connecting with an adjacent testing device 1.

The host 100 is connected to a first serial interface 17 of a first testing device 1 via the serial port 102. A second serial interface 18 of the first testing device 1 is connected to a first serial interface 17 of a second testing device 1. A second serial interface 18 of the second testing device 1 is connected to a first serial interface 17 of a third testing device 1, and the rest of each testing device 1 of the testing device array 200 are orderly connected in series in this way. The host 100 may also be selectively connected to the first serial interface 17 of the second testing device 1 via the serial port 102, or the first serial interface 17 of any of the rest of each of the testing devices 1.

Figure 3:
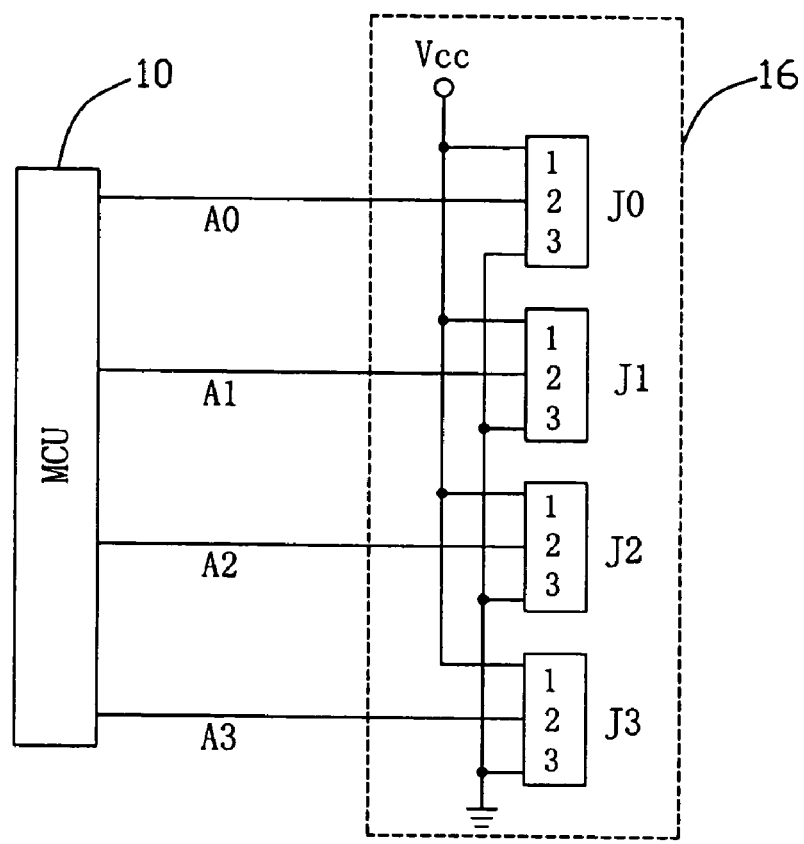
FIG. 3 is a circuit diagram of an address setting unit of each testing device of FIG. 1.

Referring also to FIG. 3, it shows a circuit diagram of the address setting unit 16 of each testing device 1 of FIG. 1. The address setting unit 16 of each testing device 1 includes four bidirectional switches J0, J1, J2, and J3 for setting four-bit addresses A0, A1, A2, and A3. When the switch J0 is set at pin 1, A0 is logic level "1". When the switch J0 is set at pin 3, A0 is logic level "0". Addresses A1, A2, and A3 are set in the same manner as A0. So each switch of each testing device 1 may be set according to the desired address for that testing device 1. The addresses for each of the fifteen testing devices 1 are as follows: "0000", "0001", "0010", "0011", "0100", "0101", "0110", "0111", "1000", "1001", "1010", "1011", "1100", "1101" and "1110".

Figure 4:
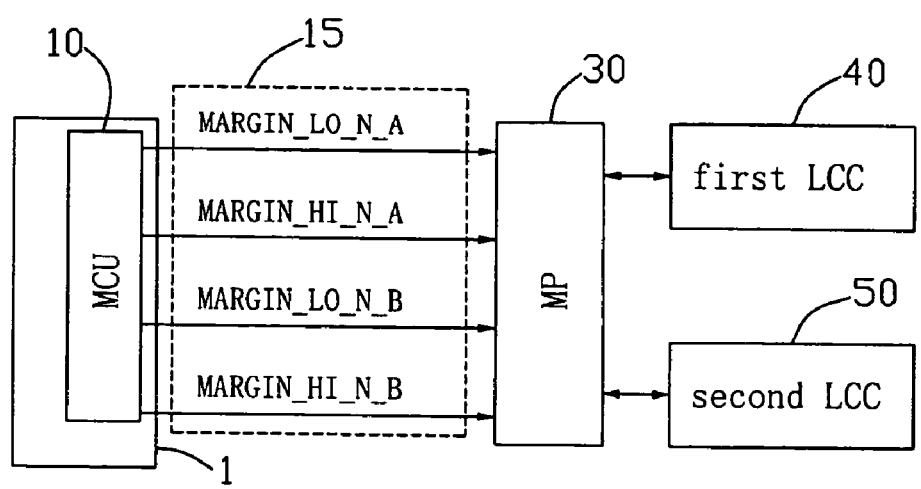
FIG. 4 is a block diagram of a voltage margin control unit of each testing device of FIG. 1.

Referring also to FIG. 4, it shows a block diagram of a voltage margin control unit 15 of each testing device 1 of FIG. 1. The voltage margin control unit 15 may detect work reliability of the first of the LCC 40 or the second LCC 50 across a voltage range. Table 1 shows respective voltages of three voltage margin modes, the high mode is +5% margin of the standard voltage, and the low mode is −5% margin of the standard voltage.

TABLE 1 respective voltages of three voltage margin modes

| | standard mode | |
|---|---|---|
| | 5 V | 2.5 V |
| high mode | 5*(1 + 5%) = 5.25 V | 2.5*(1 + 5%) = 2.625 V |
| low mode | 5*(1 − 5%) = 4.75 V | 2.5*(1 − 5%) = 2.375 V |

The voltage margin unit 15 includes four controlling signals of work voltage. The four controlling signals are MARGIN_LO_N_A, MARGIN_HI_N_A, MARGIN_LO_N_B and MARGIN_HI_N_B. The MARGIN_LO_N_A and MARGIN_HI_N_A are used for controlling work voltage of the first LCC 40. The MARGIN_LO_N_B and MARGIN_HI_N_B are used for controlling work voltage of the second LCC 50. To select any testing device 1 connected to the MP 30 via a cable (not shown), the MP 30 can transmit four controlling signals to the first LCC 40 or the second LCC 50, so as to control work voltage of the first LCC 40 or the second LCC 50.

Figure 5:
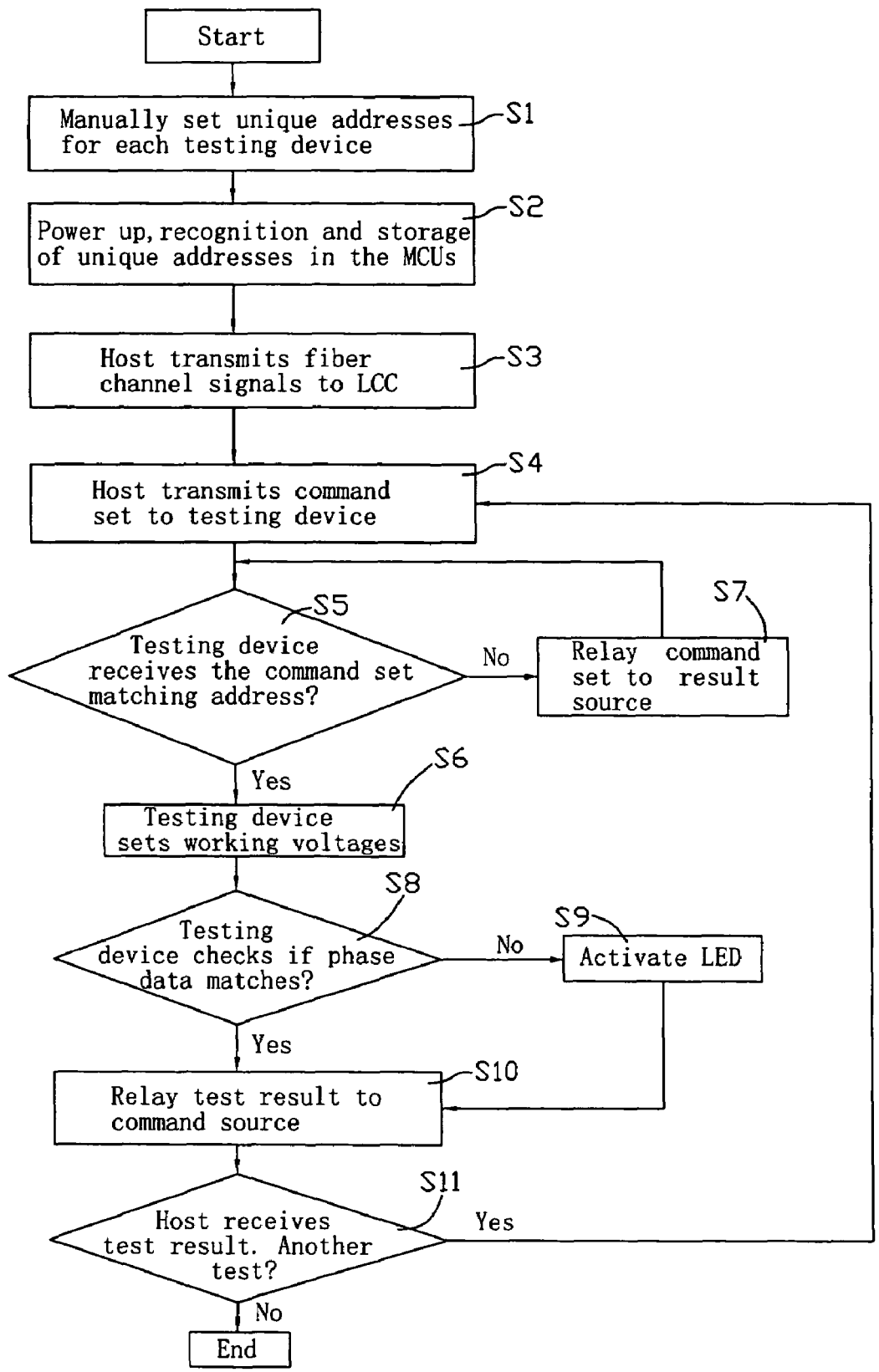
FIG. 5 is a flow chart of a testing method of the testing system of FIG. 1.

Referring to FIG. 5, a testing method of the testing system of FIG. 1 is shown. In the preferred embodiment, the host 100 is connected to the first testing device 1. Unique addresses for each of the testing devices 1 are set manually. Then the testing system is powered up. Each MCU 10 of each testing device 1 detects and stores its unique address. The host 100 sends command sets to the first testing device 1 and receives a test result from the first testing device 1. The command sets are sent sequentially, with the first command set containing the unique address of the first testing device 1, and the next command set is issued after receiving test result of the previous command set containing the unique address of the next testing device 1. The process continues in this way until all testing devices 1 have received command sets and returned test results. Each testing device 1 receives command sets and test results. Each testing device 1 receives the command sets from a command source, either the host 100 or another device. In the preferred embodiment, only the first testing device 1 receives command sets from the host 100, the remaining testing devices 1 receive command sets from another of the testing devices 1. Each testing device 1 receives test results from a result source, which is another of the testing devices 1 that is not its command source. When a testing device 1 receives a command set, it checks to see if the command set contains its unique address. If yes, then testing is done and results returned to the command source. If no, the command set is passed on to the result source. When a testing device 1 receives a test result, it passes the result to the command source.

Step 1: manually set a unique address for each of the testing devices 1 of the testing device array 200. Each of the testing devices 1 receives a unique address through the setting address unit 16 thereof. An address of the first testing device 1 is "0000", an address of the second testing device 1 is "0001", and an address of the third testing device 1 is "0010", and so on. The address of each of the testing devices 1 is as follows in Table 2.

TABLE 2 address of each of the testing devices

| number | address | number | address | Number | address |
|---|---|---|---|---|---|
| first testing device | 0000 | second testing device | 0001 | third testing device | 0010 |
| forth testing device | 0011 | fifth testing device | 0100 | sixth testing device | 0101 |
| seventh testing device | 0110 | eighth testing device | 0111 | ninth testing device | 1000 |
| tenth testing device | 1001 | eleventh testing device | 1010 | twelfth testing device | 1011 |
| thirteenth testing device | 1100 | fourteenth testing device | 1101 | fifteenth testing device | 1110 |

Step 2: at the instant of power on, the testing device array 200 senses the addresses of Step 1, and stores the unique addresses into the MCUs 10 of each of the testing devices 1. The address "0000" is stored in the MCU 10 of the first testing device 1, the address "0001" is stored in the MCU 10 of the second testing device 1, and the address "0001" is stored in the MCU 10 of the third testing device 1, and so on, for the remaining corresponding addresses of the rest of the testing devices 1.

Step 3: the host 100 transmits fiber channel signals to the first LCC 40 and the second LCC 50 via the HBA, then the MP 30 distributes the fiber channel signals to each of the testing devices 1.

Step 4: the host 100 transmits a command set of fifteen command sets to the first testing device 1 of the testing device array 200 via the serial port 102. Each command set includes settings for work voltage modes of the first LCC 40 or the second LCC 50 according to which is selected for testing at that time, signal integrity (SI) parameters, phase data parameters, and one of the addresses of the test devices 1. The first command set will contain the first address "0000", the second command set will contain the second address "0001" and so on to the $15^{th}$ address of the $15^{th}$ testing device 1. The first testing device 1 is connected to the MP 30 via a cable (not shown) in the preferred embodiment. The MP 30 will transmit the settings for work voltage modes of the selected first LCC 40 or the second LCC 50 to a voltage control end of the first LCC 40 or the second LCC 50, for controlling the work voltage.

Step 5: the first testing device 1 checks if the address of the command set and the stored address of the first testing device 1 are a match. If not matched, Step 7 is next. If matched, Step 6 is next.

Step 6: when the addresses match, the first testing device 1 sets the work voltage modes of the selected first LCC 40 or the second LCC 50. The working voltages are respectively set in standard mode for 5 V, 2.5 V, in high mode for 5.25 V, 2.625 V, and in low mode for 4.75 V, 2.375 V.

Step 7: relay the command set to its result source (the second testing device 1).

Step 8: the MCU 10 of the first testing device 1 writes the phase data parameters to it's fiber channel hub 12, and sets a frame mode, samples a first phase data from the fiber channel signals, and compares the first phase data with the phase data parameters. If matched step 10 is next. If not matched, step 9 is next.

Step 9: the red LED is activated to indicate an error of a path corresponding to the path that the first testing device 1 is testing. The first testing device 1 tests the first path, the next testing device tests the next path, and so on. Then step 10 is next.

Step 10: relay a result to the host 100.

Step 11: the host 100 receives the result. If no more tests, then end here. If more tests then step 4 is next repeating the process until all of the testing devices 1 have received a command set and returned a result.

If the first testing device 1 finishes testing and gets a first result, the first result is transmitted to the host 100 directly. If another testing device 1 finishes testing and gets a second result, the second result is transmitted to its command source, and thus the second result is relayed back to the host 100. For example, when the third testing device 1 tests the first LCC 40, a third result will be transmitted to the second testing device 1, then transmitted to the first testing device 1, and then finally transmitted to the host 100. If any of results of the fifteen testing devices 1 is wrong, then the currently tested the first LCC 40 or the second LCC 50 is bad.

The testing system and testing method for the first LCC 40 or the second LCC 50 of the present embodiment do not need to use hard disk drives (HDDs). Only the testing devices 1 are needed to complete testing of the first LCC 40 or the second LCC 50. Thus, the present embodiment provides a simple and low-cost system and method for testing LCCs.

It is believed that the present embodiment and it's advantages will be understood from the foregoing description, and it will be apparent that various changes may be made thereto without departing from the spirit and scope of the embodiment or sacrificing all of its material advantages, the example hereinbefore described merely being preferred or exemplary embodiment.

We claim:

1. A testing system for a link control card (LCC) of a storage device comprising:
    a host;
    a LCC comprising two terminals, one of the terminals being connected to the host, signals transmitted from the host to the LCC;
    a middle plane (MP) comprising two terminals, one of the terminals being connected to the other one of the terminals of the LCC; and
    a testing device being connected to the other one of the terminals of the MP, the host being connected to the testing device for sending out commands and receiving results, the testing device comprising:
    a micro-controller unit (MCU);
    a connector being connected to the MCU for receiving the signals;
    a hub being connected to the connector for testing the received signals;
    a voltage margin control unit being connected to the MCU for controlling a voltage margin of a voltage supplied by the MP to the LCC;
    an address setting unit being connected to the MCU; and
    a first interface being connected to the MCU for outputting results.

2. The testing system as claimed in claim 1, wherein the testing device comprises an array having a plurality of testing devices connected in series.

3. The testing system as claimed in claim 2, wherein each of the testing devices further comprises an inter-integrated circuit (I2C) level translator, connected between the MCU and the hub, for converting voltage levels therebetween.

4. The testing system as claimed in claim 2, wherein each of the testing devices further comprises a second interface connected to the MCU, for coupling to a neighbouring testing device.

5. The testing system as claimed in claim 2, wherein the host is connected to the first interface of a first testing device of the array via a serial port.

6. The testing system as claimed in claim 5, wherein the second interface of one of the testing devices except the final one of the array is connected to the first interface of a next one of the testing devices.

7. The testing system as claimed in claim 2, wherein the address setting unit of each of the testing devices comprises a plurality of switches.

8. The testing system as claimed in claim 1, wherein the MP is also connected to another LCC, the host has a host bus adaptor (HBA) to output signals to the LCC and said another LCC, and the signals are distributed to each of the testing devices by the MP.

9. A testing method for a link control card (LCC), comprising:
    providing an array having a plurality of testing devices, each of the testing devices comprising a micro-controller unit (MCU);
    manually setting a unique address of each of the testing devices of the array;
    detecting the address of each of the testing devices, and storing the address respectively into the MCU of each of the testing devices;

a host transmitting signals to the LCC; and distributing the signals to each of the testing devices through a middle plane (MP);

the host transmitting a command set of a plurality of command sets to a testing device of the array, each of the command sets comprising settings for work voltage modes supplied to the LCC, signal integrity (SI) parameters, and a matching address corresponding to one of the addresses;

the testing device of the array checking the matching address of the command set with the stored address therein;

when the address of the command set match with the stored address of the testing device, the testing device of the array will set a work voltage mode of the LCC; and the testing device detecting SI of the signals, and returns a result.

10. The testing method as claimed in claim 9, wherein the testing devices are connected in series.

11. The testing method as claimed in claim 9, wherein the step of setting the work voltage modes of the LCC further comprises:
   connecting the testing device to the MP via a cable; and
   the MP transmitting work voltage modes to a voltage control end of the LCC.

12. The testing method as claimed in claim 11, further comprising:
   setting standard work voltages to be 5 V and 2.5 V;
   setting high work voltages to be 5.25 V and 2.625 V; and
   setting low work voltages to be 4.75 V and 2.375 V.

13. The testing method as claimed in claim 9, wherein each of the command sets further comprises phase data parameters of the signals.

14. The testing method as claimed in claim 13, wherein the step of detecting SI of the signals further comprises:
   writing the phase data parameters of the signals to a hub of the testing device;
   setting a frame mode;
   sampling a corresponding phase data from the signals;
   comparing the phase data with the phase data parameters of the signals; and
   determining a path corresponding the testing devices of the LCC is okay if the phase data and the phase data parameters of the signals are matched.

15. The testing method as claimed in claim 9, further comprising the steps of: when not matched, the host continuing transmit the command set to a result source, continuing checking the address of the command set with the address of the result source until all of the testing devices match the stored address and the address of the command set.

16. The testing method as claimed in claim 9, further comprising the steps of: the host receives the result, if no more tests, then end, if more tests then repeating until all testing devices have received a command set and returned a result.

17. The testing method as claimed in claim 15, wherein each of the testing devices receives a command set from a command source defined from a group of the host and the testing devices other than the each of the testing devices, and returns a result to the command source.

18. The testing method as claimed in claim 16, wherein when a testing device receives a command set that contains its matching address, the testing device will complete a test and returns a result to its command source.

19. The testing method as claimed in claim 16, wherein when a testing device receives a command set that does not contain its matching address, it transmits the command set to its result source.

20. A method for testing linkage of an electronic device, comprising the steps of:
   electrically connecting a plurality of testing devices to a link control unit of an electronic device respectively;
   electrically connecting said plurality of testing devices in series to data-communicate each of said plurality of testing devices with another serially neighboring one of said plurality of testing devices;
   assigning an address exclusively for said each of said plurality of testing devices;
   transmitting test signals to said link control unit of said electronic device;
   transmitting a command set to said each of said plurality of testing devices by means of identifying another address contained in said command set with said assigned address; and
   retrieving a test result from said each of said plurality of testing devices based on said identified another address when said test result is available to identify a current linking status between said link control unit and said each of said plurality of testing devices due to transmission of said test signals therebetween.

* * * * *